United States Patent Office
2,994,784
Patented Aug. 1, 1961

1

2,994,784
BISTABLE CONTROL APPARATUS
Marshall P. White, Grand Haven, Mich., and Russell J. Hall, Cheektowaga, N.Y., assignors to Westinghouse Electric Corporation, East Pittsburgh, Pa., a corporation of Pennsylvania
Filed Dec. 4, 1957, Ser. No. 700,680
4 Claims. (Cl. 250—223)

The present invention relates, in general, to bistable control apparatus, and more particularly to bistable control apparatus operative with workpiece position responsive apparatus operative to energize a workpiece control member for performing a predetermined control operation relative to a workpiece in response to the position of said workpiece.

It is an object of the present invention to provide an improved bistable control apparatus, which apparatus may be operative as a workpiece position responsive device.

It is another object of the present invention to provide an improved workpiece position responsive device operative with a workpiece having a predetermined characteristic, such as a relatively high temperature, and responsive to that characteristic, such as responsive to the thermal radiations from said workpiece due to that temperature.

It is a different object of the present invention to provide improved bistable control apparatus that is more stable in operation and has a faster operation response time.

It is an additional object of the present invention to provide an improved workpiece control device responsive to radiant energy from a workpiece for controlling a predetermined operation such as classification or the like or some subsequent operation relative to that workpiece.

It is another object of the present invention to provide an improved bistable control device having at least a first and a second state of operation that is more stable in operation in each of its states of operation and having an improved response time in changing between said operation states.

It is a still different object of the present invention to provide an improved bistable control apparatus such as a Flip-Flop circuit employing semiconductor devices, said apparatus being better operative under high ambient temperature conditions and having an improved cut-off operation relative to an output signal provided by said apparatus.

These and other objects of the present invention will become apparent from the following description taken in conjunction with the accompanying drawings, wherein.

Figure 1:
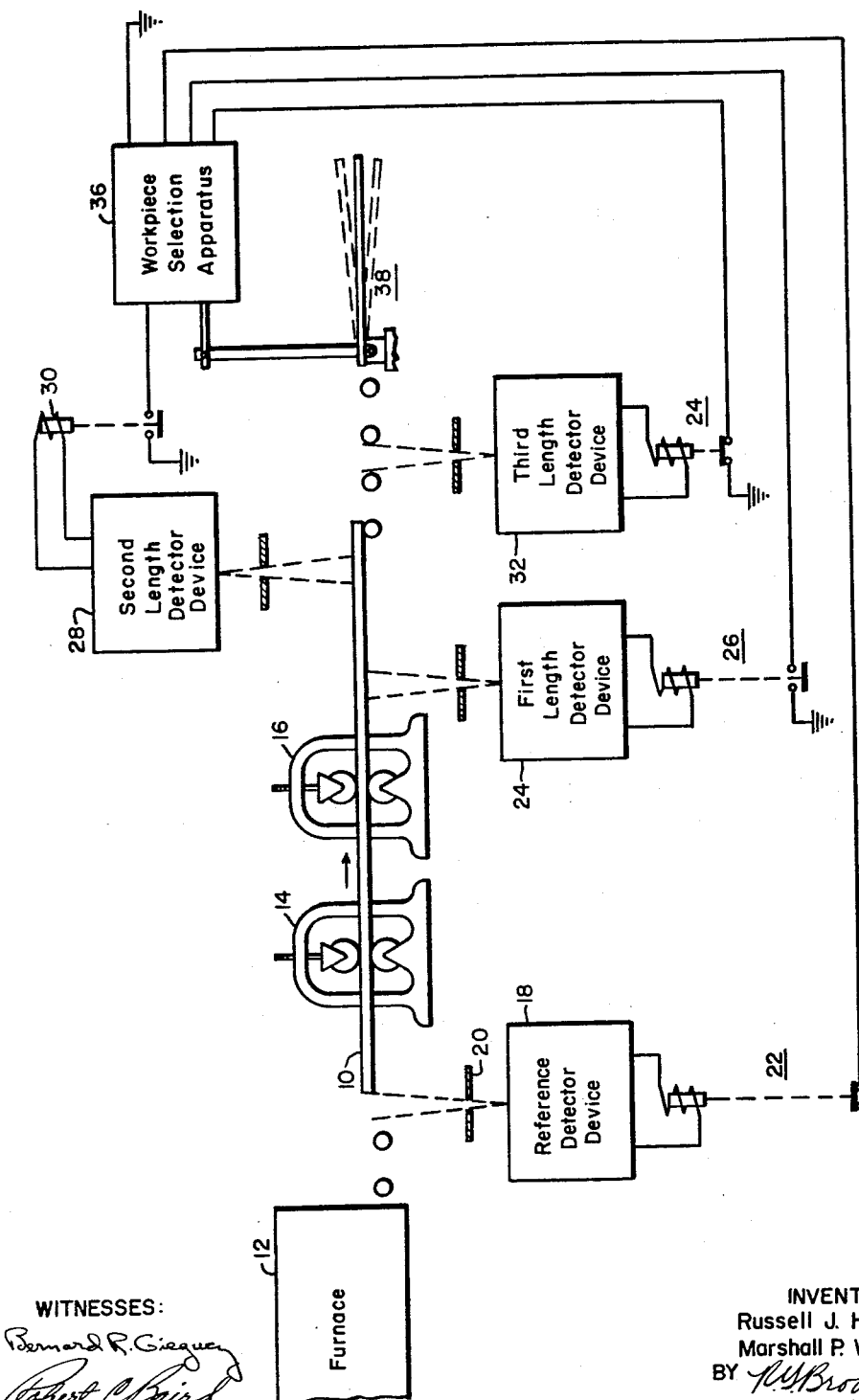
FIGURE 1 is a diagrammatic showing of control apparatus in accordance with the present invention.

In FIG. 1 there is shown a workpiece 10 movable along a workpath from a furnace 12 through a first rolling mill or like device 14 and a second rolling mill 16 as may be desired. A reference detector device 18 is responsive to radiation from the workpiece 10, passing through a shield or the like 20, and is operative for opening the contacts of a relay device 22 when the radiations from the workpiece 10 are received by the reference detector device 18. A first length reference device 24 is responsive to radiations from the workpiece 10 due to the temperature of the workpiece in which case the radiations are thermal, or due to any other type of radiations such as light or other sources of energy which may be supplied by a suitable source positioned on the opposite side of the workpiece and utilized in the practice of the present invention. The first length detector device 24, when such radiations are received, is operative to open the contacts of a relay device 26 as shown in FIG. 1. A second length detector device 28 is responsive to radiations from the workpiece 10 and is operative to open the contacts of a relay or like device 30 when such radiations are received. A third length detector device 32 is responsive to radiations from the workpiece 10, and when no such radiations are received as is the situation shown in FIG. 1, the contacts of the relay device 34 are left closed and the relay device 34 is not energized.

The contacts of the relay devices 22, 26, 30 and 34 are operative with a workpiece selection control apparatus 36 such that when the workpiece 10 passes beyond the reference detector 18, then the workpiece selector apparatus 36 is responsive to signals received from the respective first length detector device 24, second length detector device 28 and third length detector device 32 for providing an indication of the length of the workpiece 10 and/or for subsequent classification purposes through the classification device 38. In other words, when the workpiece 10 is of a first length that is less than the first length detector device 24 will respond to, then after the workpiece 10 has passed the reference detector device 18, the workpiece is placed in a first classification. When the length of the workpiece as indicated by its leading end falls between the first length detector device 24 and the second length detector device 28, the workpiece is placed in a second classification by the control device 38. When the length of the workpiece 10 falls between the second length detector device 28 and the third length detector device 32 after the opposite end of the workpiece 10 has moved past the reference detector device 18 in the travel of the workpiece 10 along the illustrated workpath, then the workpiece is separated into a third area or classification by the control apparatus device 38.

Figure 2:
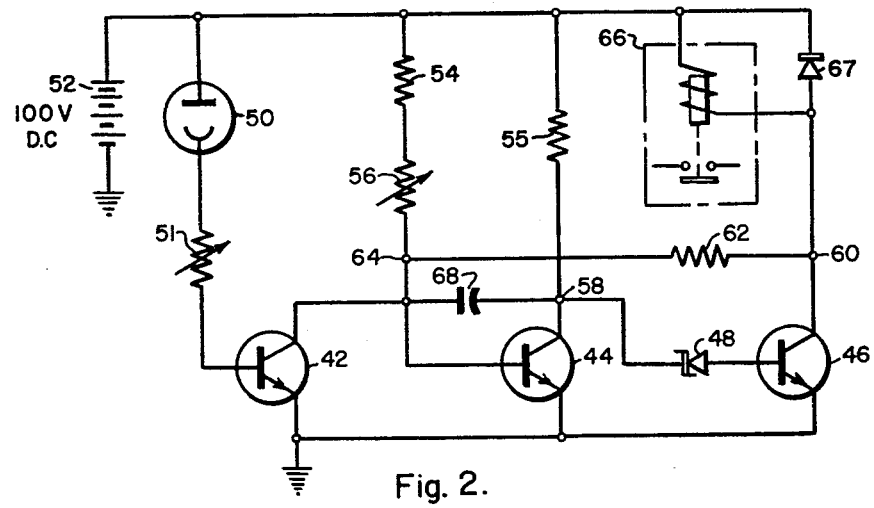
FIG. 2 is a schematic showing of one of the detector devices shown in FIG. 1.
Figure 3:
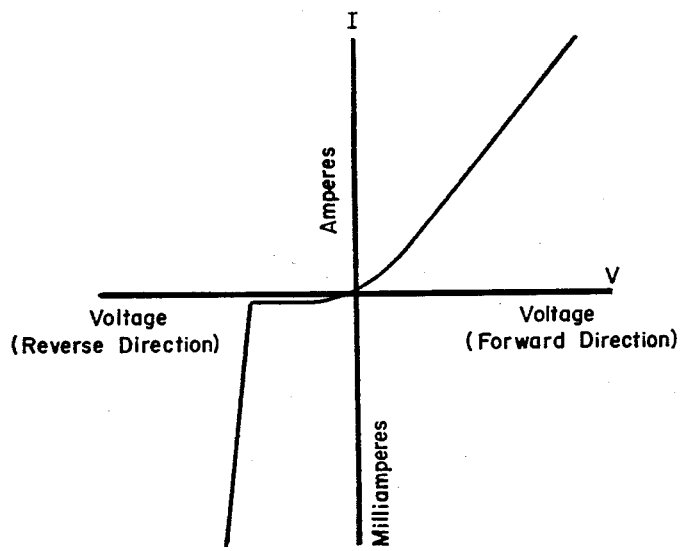
FIG. 3 is a curve chart illustrating the operation of a Zener diode device of the type shown in FIG. 2.

In FIG. 2 there is shown a schematic circuit arrangement for any one of the detector devices as shown in FIG. 1. The detector device shown in FIG. 2 includes a single transistor preamplifier input stage including the transistor 42 followed by a Flip-Flop output stage including transistors 44 and 46 and a Zener diode device 48. The transistors as shown in FIG. 2 are of the N-P-N type and are operated in the common emitter configuration.

A photocell or like device 50 is responsive to radiation received from the workpiece 10 to effectively vary the impedance of the photocell 50 as a function of the radiation received. When radiation is not received from the workpiece, the impedance or resistance of the photocell 50 is very high such that effectively no input signal is applied to the base of the transistor 42 from the voltage source 52. Under these conditions, the preamplifier transistor 42 will be in a non-conducting state and as a result current will flow through the resistor 54 and the resistor 56 and through the base-emitter circuit of the transistor 44 causing the latter transistor 44 to conduct. Circuit junction 58 is now at a low voltage potential and is operative to keep the output transistor 46 in its cutoff condition and its output load current at a minimum value. The Zener diode 48 connected in the base circuit of the transistor 46 is operative to maintain the transistor 46 in this cutoff condition despite the substantial saturation voltage of the silicon transistor 44 which is conducting. Since the transistor 46 is in its cutoff condition, the voltage of the circuit junction 60 will be at a high positive potential, which voltage is fed back through the resistor 62 to the base circuit of the transistor 44 further driving the latter transistor 44 into saturation to stabilize the detector device as shown in FIG. 2 in the no-output operative state or condition.

When a positive-going input signal is applied to the base of the transistor 42 resulting from radiation falling upon the photocell 50 to effectively lower the resistance or impedance of the photocell 50, the transistor 42 starts to conduct. This results in a slight reduction of the voltage at the circuit junction 64 and is operative to shunt part of the current through resistors 54 and 56 away from the base circuit of the transistor 44 resulting in the transistor 44 becoming less conductive. When the transistor 44 comes out of its saturation condition, the potential of the circuit junction 58 begins to rise and increase in value. When the potential or voltage of the circuit junction 58 is sufficient to break down the Zener diode 48 in its reverse direction, in other words is greater than the predetermined reverse direction breakdown voltage of the diode 48, current begins to flow in the base circuit of the transistor 46 causing the transistor 46 to become conductive. The voltage of the circuit junction 60 now begins to decrease to further reduce the base current of the transistor 44 due to the action of the feedback resistor 62 passing less current in a direction from the circuit junction 60 to the circuit junction 64. This results in a cascading action until the transistor 46 is driven into saturation and the transistor 44 is driven to its cutoff condition, and load current through the load device which may comprise a relay member 66 is now at a maximum value. The latter-described cascading action takes place very rapidly and in the order of a few microseconds.

When the radiation from the workpiece decreases or stops due to the workpiece passing the sensing area of the particular detector device involved, the input signal to the base of the transistor 42 is reduced and the transistor 42 conducts less resulting in less current to be shunted in parallel around the base circuit of the transistor 44 and, in addition, causes the voltage of the circuit junction 64 to increase in value. The transistor 44 now begins to conduct to increase the current flow through the transistor 44 and to decrease the potential of the circuit junction 58 and thereby to decrease the current flow through the transistor 46 by way of the Zener diode 48. This causes the voltage of the circuit junction 60 to increase and causes feedback current to pass through the feedback resistor 62 to the base circuit of the transistor 44. After a reversed cascade action, the transistor 44 is conducting at its saturation condition and the transistor 46 is in its cutoff condition.

The base current of the transistor 44 is determined by the resistor 54 and the resistor 56. The latter is used to compensate for possible input and gain variations of the transistor 44. The capacitor 68 is used to suppress possible oscillations caused by stray pickup effects and the like. The capacitor 68 does not materially affect the switching time of the detector device as shown in FIG. 2. The resistor 55 determines the current applied to the base circuit of the transistor 46 and for maximum stability must be small enough to drive the transistor 46 well into its saturation condition of operation. The value of the feedback resistor 62 is limited such that if it is too large, the bias for the transistor 44 is furnished mostly through the resistor 54 and the resistor 56 making it necessary to greatly change the input to make the circuit switch between its respective states of operation. However, if the value of the feedback resistor 62 is too small, the transistor 44 will be driven far into its saturation condition to again make it difficult to switch to its opposite state of operation.

High ambient temperature conditions make it desirable to use silicon transistors in the circuit arrangement shown in FIG. 2. These transistors have a relatively large saturation voltage in the order of 5 to 15 volts. When the transistor 44 is conducting, this latter voltage might be high enough to cause the transistor 46 to be partially conductive. The Zener diode 48 in the base circuit of the transistor 46 blocks the latter voltage and prevents the transistor 46 from conducting when no input signal is present and applied to the base of the transistor 42. However, when an input signal is applied to the base of the transistor 42, the voltage of the circuit junction 58 overcomes the Zener diode reverse direction breakdown voltage allowing current to flow in the base circuit of the transistor 46 and to cause the transistor 46 to become conductive. The Zener diode 48 is also desirable when germanium transistors are used. Although the germanium transistors have a low saturation voltage, they also are not cut off when the base voltage is zero. The Zener diode 48 eliminates the need of a negative base potential to insure cutoff operation under these conditions.

A practical application of the detector device as shown in FIG. 2 is shown in FIG. 1. The photocell 50 may comprise a cadmium selenide photocell utilized to detect the presence of visible or infrared radiation such as may be emitted by a hot metal member 10. The output of the circuit as shown in FIG. 2 may be employed to energize the operating coil of a relay device 66 which is then available for controlling other devices such as the classification device 38 shown in FIG. 1. The resistor 51 is employed to control the sensitivity of the circuit. The diode 67 is a low impedance discharge path to prevent the inductive voltage surge from the coil 66 damaging the transistor 46.

When no radiation is energizing the photocell 50, the resistance of the photocell 50 is relatively high and the transistor 42 is not conducting and the load current passing through the relay device 66 is at a minimum. When radiation falls on the photocell 50, the resistance of the photocell 50 is greatly reduced to cause current to flow in the base circuit of the transistor 42 and causes the load current through the load device 66 to be at a maximum.

It should be here noted that the bistable control apparatus in accordance with the present invention is related to another bisable transisor amplifier device as shown and described in copending application Serial No. 656,342, filed May 1, 1957, by the present inventors and assigned to the same assignee as the present application.

In an actual embodiment made of the present control apparatus the following elements were satisfactorily employed.

Resistor 54_____ohms__ 10,000
Resistor 55_____do____ 15,000
Resistor 62_____do____ 100,000
Capacitor 68_____microfarads__ 0.5

Although the present invention has been described with a certain degree of particularity, it should be understood that the present disclosure has been made only by way of example and that numerous changes in the details of construction and the combination and arrangement of parts may be resorted to without departing from the scope and the spirit of the present invention.

We claim as our invention:

1. In workpiece position detection apparatus operative with a workpiece for energizing a workpiece control member to perform a predetermined operation relative to said workpiece, the combination of a bistable control device adapted to energize said control member and including a pair of conductive devices operative such that a first of said conductive devices is conducting during a first operating state of said bistable device and the second conductive device is conducting during the second operating state of said bistable device, and a workpiece sensing device responsive to the presence of a workpiece in a predetermined position and operatively connected to said bistable device for causing a predetermined one of said conductive devices to become conductive and thereby control the energization of said workpiece control member when said workpiece is in said predetermined position, with said bistable device including a Zener diode device connected between said first and second conductive devices and having a predetermined reverse direction breakdown operation controlled by the conduction of said first conductive device and operative to control the conduction of said second control device.

2. In workpiece temperature detection apparatus operative to energize a workpiece control member operative with said workpiece in response to a workpiece being present in a predetermined position, the combination of bistable control means operatively connected to said control member and having a first operating state in which said control member is energized and a second operating state in which said control member is not energized, said bistable control means including a diode device having a predetermined reverse direction breakdown characteristic causing said bistable control means to operate in a predetermined one of said operating states, and a workpiece position sensing device responsive to the position of said workpiece and operatively connected to said bistable control means for controlling the breakdown of said diode device and thereby causing said control means to operate in said one state of operation when said diode device breakdown has been effected and causing said control means to operate in said second state of operation when said diode device breakdown has not been effected.

3. In workpiece position indicating apparatus operative with a workpiece for energizing a load device to perform a predetermined operation relative to said workpiece, the combination of a bistable control device operatively connected to energize said load device and having a first condition of operation in which an output signal is supplied to said load device and a second condition of operation in which an output signal is not supplied to said load device, with said bistable control device including a unidirectionally conductive device having a reverse breakdown voltage characteristic at which the latter device will become substantially conductive in a reverse direction, and a workpiece sensing device responsive to the presence of said workpiece in a predetermined position and operatively connected to said bistable control device for causing said unidirectionally conductive device to become substantially conductive in its reverse direction such that said bistable control device operates in said first operating condition when said workpiece is present in said predetermined position and for causing said unidirectional conductive device to become substantially nonconductive in its reverse direction such that said bistable control device operates in said second operating condition when said workpiece is not present in said predetermined position.

4. In workpiece detector apparatus, the combination of an amplifier device having an input and an output, a bistable Flip-Flop device having an input connected to the output of said amplifier device and including first and second semiconductor devices with a unidirectionally conductive device connected between said first and second semi-conductor devices such that said first device is conducting when said second device is not conducting, with said unidirectionally conductive device having a predetermined reverse direction breakdown voltage characteristic at which the latter device will break down and become conductive in a reverse direction to allow said second device to become conductive, and a workpiece sensitive device operatively connected to the input of said amplifier and responsive to the position of said workpiece for causing said amplifier device to decrease the conductivity of said first device and thereby effect the reverse direction breakdown of said unidirectionally conductive device, with said second device being responsive to the conductivity in a reverse direction of said unidirectionally conductive device for causing said second device to become conductive.

References Cited in the file of this patent

UNITED STATES PATENTS

| 1,998,950 | Cockrell | Apr. 23, 1935 |
| 2,493,785 | Strickland | Jan. 10, 1950 |
| 2,551,650 | Urbach | May 8, 1951 |
| 2,751,545 | Chase | June 19, 1956 |
| 2,753,464 | Stone | July 3, 1956 |
| 2,831,986 | Sumner | Apr. 22, 1958 |
| 2,877,357 | Pearsell et al. | Mar. 10, 1959 |
| 2,920,214 | Moore | Jan. 5, 1960 |
| 2,922,148 | Feldman et al. | Jan. 19, 1960 |

FOREIGN PATENTS

| 83,212 | Netherlands | Nov. 15, 1956 |
| 1,138,405 | France | Jan. 28, 1957 |

OTHER REFERENCES

Linvill: Nonsaturating Pulse Circuits Using Two Junction Transistors, pages 826–833, Proceeding of the IRE, July 1955.